(12) United States Patent
Biedermann et al.

(10) Patent No.: US 7,995,542 B1
(45) Date of Patent: Aug. 9, 2011

(54) DATA ADAPTER OR COMMUNICATION DEVICES FOR THE TELECOMMUNICATION OF USEFUL DATA, PARTICULARLY OF PACKET DATA AND/OR VOICE DATA

(75) Inventors: Rolf Biedermann, Ahaus (DE); Wilhelm Müller, Wörth (DE)

(73) Assignee: Gigaset Communications GmbH, Munich (DE)

( * ) Notice: Subject to any disclaimer, the term of this patent is extended or adjusted under 35 U.S.C. 154(b) by 0 days.

(21) Appl. No.: 09/646,442

(22) PCT Filed: Mar. 18, 1999

(86) PCT No.: PCT/DE99/00772
§ 371 (c)(1),
(2), (4) Date: Sep. 18, 2000

(87) PCT Pub. No.: WO99/48248
PCT Pub. Date: Sep. 23, 1999

(30) Foreign Application Priority Data

Mar. 18, 1998 (DE) .................................. 198 11 630

(51) Int. Cl.
*H04W 4/00* (2009.01)
(52) U.S. Cl. ...................... 370/338; 370/465; 455/552.1
(58) Field of Classification Search .................. 370/328, 370/338, 465; 455/466, 557, 556.1, 554.1, 455/554.2, 556.2, 552.1, 457, 554
See application file for complete search history.

(56) References Cited

U.S. PATENT DOCUMENTS

| | | | | |
|---|---|---|---|---|
| 4,935,927 A | * | 6/1990 | Kaewell et al. | 370/506 |
| 5,336,099 A | * | 8/1994 | Aldous et al. | 439/131 |
| 5,533,099 A | * | 7/1996 | Byrne | 455/552.1 |
| 5,537,558 A | * | 7/1996 | Fletcher et al. | 710/305 |
| 5,628,055 A | * | 5/1997 | Stein | 455/575.1 |
| 5,663,957 A | * | 9/1997 | Dent | 370/347 |
| 5,737,703 A | * | 4/1998 | Byrne | 455/442 |
| 5,754,542 A | * | 5/1998 | Ault et al. | 370/342 |
| 5,773,332 A | * | 6/1998 | Glad | 439/344 |
| 5,949,775 A | * | 9/1999 | Rautiola et al. | 370/338 |
| 5,984,731 A | * | 11/1999 | Laity | 439/676 |

(Continued)

FOREIGN PATENT DOCUMENTS

EP        671859  A2  *  9/1995

(Continued)

OTHER PUBLICATIONS

Carpintero, C. et al. "Requirements for the Interconnection of Base Stations in a Wireless System". ICUPC '92, First International Conference on Universal Personal Communications. Sep. 29-Oct. 1, 1992. pp. 5.06/1-05.06/6.*

Sousa, A. et al., "A Wireless Digital System Based on the DECT Standard"; 38th Midwest Symposium on Circuits & Systems: Proceedings, Rio De Janeiro, (1995) vol. 1, pp. 518-521.

*Primary Examiner* — Donald L Mills
(74) *Attorney, Agent, or Firm* — Occhiuti Rohlicek & Tsao LLP

(57) ABSTRACT

To improve the operating convenience—e.g. versatile, universal application and use—and location-independence (mobility) of the telecommunication of useful data, particularly packet data and/or voice data, using communication devices, a data adapter (DA1, DA2) is allocated both a fixed-part-specific air interface architecture (DÜM, STM, PKM2) for implementing the prescribed air interface protocol, and the air interface architectures associated with the data adapter (DA1, DA2) are activated according to the application instance, i.e., which scenario is to be produced for the telecommunication of useful data and, in particular, which communication device (KE1, KE2) is connected to the data adapter (DA1, DA2).

14 Claims, 1 Drawing Sheet

U.S. PATENT DOCUMENTS

| | | | |
|---|---|---|---|
| 5,995,500 A * | 11/1999 | Ma et al. | 370/337 |
| 6,081,534 A * | 6/2000 | Sipila | 370/466 |
| 6,327,268 B1 * | 12/2001 | Sipila | 370/467 |
| 6,351,638 B1 * | 2/2002 | Robinson | 455/418 |
| 6,415,146 B1 * | 7/2002 | Capece | 455/517 |
| 6,484,027 B1 * | 11/2002 | Mauney et al. | 455/421 |
| 7,074,061 B1 * | 7/2006 | Roth et al. | 439/131 |

FOREIGN PATENT DOCUMENTS

| | | |
|---|---|---|
| EP | 704788 A2 * | 4/1996 |
| WO | WO 94/05101 | 3/1994 |

* cited by examiner

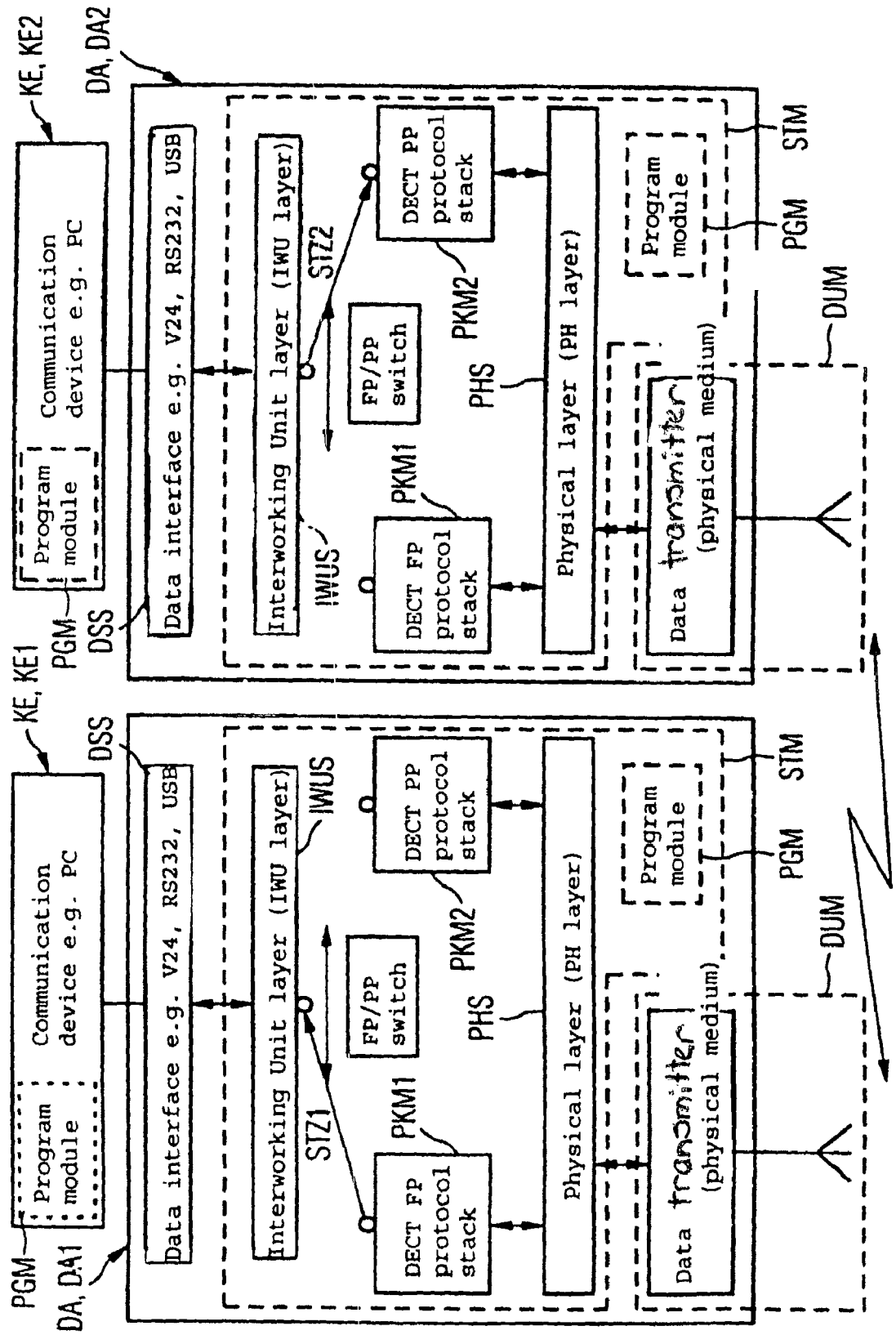

DATA ADAPTER OR COMMUNICATION DEVICES FOR THE TELECOMMUNICATION OF USEFUL DATA, PARTICULARLY OF PACKET DATA AND/OR VOICE DATA

BACKGROUND OF THE INVENTION

1. Field of the Invention

The invention relates to a data adapter for communication devices for the telecommunication of useful data, particularly of packet data and/or voice data, having: (a) a data interface supporting a link to a communication device; (b) a data transmitter for wireless transmission and reception of data based on a prescribed air interface protocol; and (c) a controller which is connected to the data interface and to the data transmitter, the data adapter further comprising program modules, the controller and program modules being configured for two-way transmission of the useful data using the data interface on the basis of an appropriate interface protocol and using the data transmitter based on the prescribed air interface protocol.

2. Description of the Related Art

For the telecommunication of useful data—transmitting and receiving, for example, voice data and/or packet data over relatively long distances—between physically separate data terminals (communication devices) in the form of data sources and data sinks in a telecommunication network (the scenario for the telecommunication of useful data), special data adapters are used which link the data terminals to the telecommunication network such that the useful data can be transmitted on the network-specific transmission link.

The publication "it+ti—Informationstechnik und technische Informatik [Information Technology and Information Systems]" 37 (February 1995), No. 1, R. Oldenbourg Verlag [publishers], pages 21 to 28, presents, under the heading "Mobile Computing—Komponenten, Systemintegration, Anwendungen [Mobile Computing—Components, System Integration, Applications]", a scenario for the telecommunication of useful data, particularly packet data.

For the telecommunication of useful data, particularly packet data, the data adapters used to date for communication devices, for example, in the form of personal computers, notebook computers, and PDA (Personal Digital Assistant), units have primarily been modems and PCMCIA cards (Personal Computer Memory Card International Association).

While the modems can be used to link the aforementioned communication devices essentially to line-connected telecommunication networks, the PCMCIA cards can also be used to link the devices to wireless telecommunication networks. Thus, a PCMCIA card and a GSM handset (GSM mobile phone) can be used to link a Notebook to the GSM network in a known manner, for example. Although such an equipment arrangement can be used independently of location, it cannot be used for different user-specific application instances. Thus, for example, it is not possible for a dedicated user-specific network for the telecommunication of useful data to be installed by the user independently of the telecommunication network.

The publication "Vortrag von A. Elberse, M. Barry, G. Fleming zum Thema: "*DECT Data Services—DECT in Fixed and Mobile Networks*", 17./18. Jun. 1996, Hotel Sofitel, Paris; Seiten 1 bis 12 and Zusammenfassung [Presentation by A. Elberse, M. Barry, G. Fleming on: "*DECT Data Services— DECT in Fixed and Mobile Networks*", Jun. 17/18, 1996, Hotel Sofitel, Paris; pages 1 to 12 and abstract]" illustrates— on the basis of the publication "*Nachrichtentechnik Elektronik [Telecommunications Electronics]*" 42 (1992) January/February No. 1, Berlin, DE; U. Pilger "*Struktur des DECT—Standards [Structure of the DECT Standard]*", pages 23 to 29 in conjunction with ETSI publication ETS 300175-1 . . . 9, October 1992 and the publications Components 31 (1993), No. 6, pages 215 to 218; S. Althammer, D. Brückmann: "*Hochoptimierte IC's für DECT—Schnurlostelefone [Ideal ICs for DECT Cordless Telephones]*" and WO 96/38991 (cf. FIGS. 5 and 6 with the associated description for each]—the basic use of DECT technology (Digital Enhanced Cordless Telecommunication) for wireless mobile telecommunication of voice data and/or packet data, where DECT network access technology for the telecommunication of useful data enables the user both to become his own network operator and to have the option of accessing a superordinate telecommunication network.

Furthermore, German Patent DE-40 26 426 discloses a system for data transmission in which one or more personal computers and peripherals, particularly printers, can be connected to one another within a space wirelessly, specifically with selective access over the radio path for the purposes of data transmission.

In addition, German Patent DE-43 20 047 discloses a cordless telephone which, to extend its use to any other desired applications, has at least one mobile part which is supplemented by means of an additional interface, which is inverse to the network, to form a cordless telephone line unit (telephone outlet). Such an access capability enables virtually all the usual terminals, such as telephones, videotex, modem, fax, answering machine, telecommanding and teleaction devices and ancillary devices, to be operated directly on a mobile and wireless basis.

SUMMARY OF THE INVENTION

The object on which the invention is based is that of improving the operating convenience—e.g. versatile, universal application and use—and location-independence (mobility) of the telecommunication of useful data, particularly packet data and/or voice data, using communication devices.

This object is achieved with a data adapter for communication devices for the telecommunication of useful data, comprising: (a) a data interface supporting a link to a communication device; (b) a data transmitter for wireless transmission and reception of data based on a prescribed air interface protocol; (c) a controller which is connected to the data interface and to the data transmitter, the data adapter further comprising program modules, the controller and program modules being configured for two-way transmission of the useful data using the data interface on the basis of an appropriate interface protocol and using the data transmitter based on the prescribed air interface protocol; (d) first protocol modules for transmitting in a downlink and for receiving in an uplink; and (e) second protocol modules for receiving in said downlink and for transmitting in said uplink; (f) said controller being configured such that said first protocol modules or said second protocol modules are activated on a basis of which communication device is allocated to said data adapter for telecommunication of said useful data.

The idea on which the invention is based is that of allocating to a data adapter for communication devices for the telecommunication of useful data, particularly of packet data and/or voice data, both a fixed-part-specific air interface architecture for implementing (processing) a prescribed air interface protocol and a mobile-part-specific air interface architecture for implementing (processing) the prescribed air interface protocol, and manually and/or automatically activating the air interface architectures associated with the data adapter according to the application instance, i.e., which scenario is to be produced for the telecommunication of useful data and, particularly, which communication device is connected to the data adapter.

This makes it possible, for example, to produce different scenarios in the office and home environment. Thus, for example, it is possible to perform telecommunication of useful data, particularly voice data and/or packet data, between personal computers, notebook computers PDA units etc. used on a geographically mobile basis without any cable installation. Furthermore, it is possible for a cordless link to be produced between a personal computer, a notebook computer a PDA unit, etc., and the telecommunication network or the Internet. This implies, that in future it will be possible to "surf" the Internet from the garden using a Notebook—independently of a telephone outlet and at fixed-network charges, not, as previously, at mobile-network charges. Depending on the modem, the data adapter provided with a data interface in the form of a V.24 interface, for example, to the communication device permits data transmission rates of, e.g. up to 64 kBit/s, the transmission rate of an ISDN useful data channel.

In this context, the decision regarding which of the two air interface architectures is used is preferably made by the user of the data adapter by performing operating procedures on the data adapter or on the communication device, This is achieved by the inventive data adapter in which the controller has two control states: a first control state in which the data interface and the first protocol modules are connected, and a second control state in which the data interface and the second modules are connected in which the controller is configured to be controlled so as to adopt the two control states using operating procedures on the communication device or on the data adapter. Suitable operating procedures in this case are, preferably, key actuations and/or corresponding voice inputs.

The program modules required for operating the data adapter can be allocated either to the data adapter itself or to the communication device. Whereas arranging program modules in the communication device is suitable for personal computers, notebook computers PDA units etc., arranging program modules in the data adapter is advantageous for printers and fax machines.

Advantageous developments of the invention include the inventive data adapter being configured in the form of a card such that it can be integrated in the communication device, particularly in the form of a card, e.g. a PCMCIA card [Personal Computer Memory Card International Association]. The data adapter may be configured so that it can be connected to the communication device as a peripheral. The data interface used may be an RS232 interface, a V.24 interface or a USB (Universal Serial Bus) interface, and the air interface protocol may be the DECT protocol, the PHS protocol, or the GSM protocol or the UMTS protocol for a paired and unpaired frequency range. Finally, the communication device may be a device such as a personal computer, a notebook computer, a PDA unit, a fax machine, a printer, a line-connected telephone and /or a server-controlled local area network.

BRIEF DESCRIPTION OF THE DRAWINGS

An illustrative embodiment of the invention is explained with reference to the FIGURE.

The single FIGURE is a block diagram showing the basic structure with the inventive data adapter.

DESCRIPTION OF THE PREFERRED EMBODIMENTS

The data adapter shown in the FIGURE is based on the OSI/ISO layer model [cf. (1): Unterrichtsbätter [Training sheets]—Deutsche Telekom, volume 48, February 1995, pages 102 and 111; (2): ETSI publication ETS 300175-1_9, October 1992], of a data adapter DA, for example, in the form of a PCMCIA card or line unit, for communication devices KE for the telecommunication of useful data. This data adapter is used particulary for voice data and/or packet data, using an application instance (the scenario for the telecommunication of voice data and/or packet data) in which a first communication device KE1 (e.g., in the form of a personal computer (PC)), using a first data adapter (DA1) (e.g., in the form of a DECT data adapter), and a second communication device KE2 (e.g., in the form of a personal computer (PC)), using a second data adapter DA2 (e.g., in the form of a DECT data adapter), are wirelessly connected to one another for the telecommunication of useful data, e.g., packet data. The two pieces of equipment (device and data adapter) are arranged at a distance, for example, which is such that they do not exceed the transmission range which is specified in the DECT standard or a possible range. Furthermore, the two units are preferably not in the radio range of a DECT base station for which the units have access authorization. To enable data to be interchanged between the two units, one data adapter from the two data adapters DA1, DA2—e.g., the first data adapter DA1—is operated in a mode specific to a DECT fixed part (the FP mode (Fixed Part)), or is controlled so as to adopt a first control state STZ1; the other data adapter—e.g., the second data adapter DA2—is operated in a mode specific to a DECT mobile part (the PP mode (Portable Part)), or is controlled so as to adopt a second control state STZ2.

To this end, the data adapter DA1, DA2 contains a data interface DSS which, by way of example, is in the form of a serial V.24 interface, an RS232 interface or a USB interface (Universal Serial Bus) and connects the data adapter DA1, DA2 to the respective communication device KE1, KE2. In addition, the data adapter DA1, DA2 contains a controller STM and data transmitter DÜM. The data transmitter DÜM correspond, on the basis of the ISO/OSI layer model, to the physical medium and contain the hardware required for telecommunication of the useful data in the data adapter DA1, DA2. The controller STM contain the software required for telecommunication of the useful data in the data adapter DA1, DA2. Thus, the controller STM contain an Interworking Unit layer (IWU layer) IWUS, a first protocol module PKM1, in the form of a DECT FP protocol stack, a second protocol module PKM2, in the form of a DECT PP protocol stack, a physical layer (PH layer) PHS, and possibly a program module PGM. Since this program module PGM may alternatively also be contained in the communication device KE1, KE2, the program module PGM is shown in dots in the FIGURE.

The IWU layer IWUS is connected, on the one hand, to the data interface DSS, and, on the other hand, to the first protocol module PKM1 or to the second protocol module PKM2—depending on the mode in which the data adapter DA1, DA2 is to be operated or on which control state STZ1, STZ2 has been set, e.g., using an FP/PP switch. The protocol modules PKM1, PKM2 are in turn connected to the PH layer PHS, which, for its part, is connected to the data transmitter DUM.

The program module PGM can be used to control (configure) the data adapter DA1, DA2, e.g., using the FP/PP switch, such that the data adapter DA1, DA2 is in the form of or functions as a base station or a mobile part. If one data adapter is configured as a base station and the other data adapter is configured as a mobile part, then the mobile part can register with the base station via the air interface using the known DECT registration procedures. The program module PGM can thus also be used to initialize and control the DECT registration procedures. Once registration is complete, wireless telecommunication of useful data between the communication devices KE1, KE2 is possible.

In addition or as alternatives to the scenario described above for the telecommunication of voice data and/or packet data, further scenarios are possible. The scenario below is representative of this multiplicity of scenarios:

A communication device, e.g., a notebook computer is connected, on the one hand, for example, to a local area network with a network server (LAN) via a LAN card (for stationary operation of the notebook computer), and, on the other hand, is connected to a data adapter. If the data adapter is operated in FP mode in this case, i.e., a base station is connected to the local area network, then another communication device, e.g., a telephone, connected to a data adapter operated in PP mode or a normal DECT mobile part can be used to perform telecommunication of voice data via the communication device connected to the local area network, either via "interworking" from the local area network (LAN) to the ISDN network or as Internet telephony.

However, if the notebook computer is not connected to the local area network (LAN) (mobile operation of the notebook computer), the data adapter connected to the notebook computer can be changed over from FP mode to PP mode. If another base station is connected to the local area network (LAN) indirectly or directly, then the notebook computer can be used to perform telecommunication of packet data for the purpose of printer or LAN server access operations (Internet sessions).

The above-described device is illustrative of the principles of the present invention. Numerous modifications and adaptions thereof will be readily apparent to those skilled in this art without departing from the spirit and scope of the present invention.

What is claimed is:

1. A first data adapter for communication devices for telecommunication of useful data, said first data adapter comprising:
   a data interface supporting a link to the communication devices;
   a data transmission part for wireless transmissions and reception of the useful data based on a prescribed air interface protocol; and
   a controller connected to both the data interface and the data transmission part and to which program modules are allocated,
   the controller and program modules operating to effect two-way transmission of the useful data,
   wherein the data interface is used based on an appropriate interface protocol and the data transmission part is used based on the prescribed air interface protocol,
   the controller
      including first protocol modules for transmission in a downlink direction and for reception in an uplink direction, by which the first data adapter is operated in a first control state in a fixed part-mode, and
      including second protocol modules for reception in the downlink direction and for transmission in the uplink direction, by which the first data adapter is operated in a second control state in a portable part-mode,
   the controller activating one of the first protocol modules and the second protocol modules based what type of communication device is allocated to the first data adapter and the manner of telecommunication of the associated useful data;
   whereby when the first data adapter is operated in the fixed part-mode, at least a second data adapter operated in the portable part-mode can be connected to the first data adapter.

2. A data adapter as claimed in claim 1, wherein the controller operates in a first control state in which the data interface and the first protocol modules are connected, and operates in a second control state in which the data interface and the second protocol modules are connected.

3. A data adapter as claimed in claim 2, wherein the controller may be controlled to adopt the first and second control states through operating procedures on the particular communication device.

4. A data adapter as claimed in claim 2, wherein the controller may be controlled to adopt the first and second control states through operating procedures on the data adapter.

5. A data adapter as claimed in claim 1, wherein the program modules are arranged in the particular communication device.

6. A data adapter as claimed in claim 1, wherein the program modules are arranged in the data adapter.

7. A data adapter as claimed in claim 1, wherein the data adapter is configured as a card, wherein the card may be integrated in the particular communication device.

8. A data adapter as claimed in claim 1, wherein the data adapter is connected to the particular communication device as a peripheral.

9. A data adapter as claimed in claim 1, wherein the data interface is selected from a group consisting of an RS232 interface, a V.24 interface, and a USB interface.

10. A data adapter as claimed in claim 1, wherein the air interface protocol is selected from a group consisting of a PHS protocol, a GSM protocol, and a UMTS protocol for a paired and unpaired frequency range.

11. A data adapter as claimed in claim 1, wherein the communication devices are selected from a group consisting of a personal computer, a notebook computer, a PDA unit, a fax machine, a printer, a line-connected telephone, and a server-controlled local area network.

12. A data adapter as claimed in claim 7, wherein the card is a PCMCIA card.

13. A data adapter as claimed in claim 1, wherein the air interface protocol is a DECT protocol.

14. A first data adapter for communication devices for telecommunication of useful data, said data adapter comprising:
   a data interface supporting a link to the communication devices;
   a data transmission part for wireless transmissions and reception of the useful data based on a DECT interface protocol; and
   a controller connected to both the data interface and the data transmission part and to which program modules are allocated,
   the controller and program modules operating to effect two-way transmission of the useful data,
   wherein the data interface is used based on an appropriate DECT interface protocol and the data transmission part is used based on the prescribed DECT interface protocol, and
   wherein the controller is configured to activate a protocol module selected from the set consisting of first protocol modules and second protocol modules,
      said first protocol modules being for transmission in a downlink direction and for reception in an uplink direction, by which the data adapter is operated in a first control state in a fixed part-mode, and
      said second protocol modules being for reception in the downlink direction and for transmission in the uplink direction, by which the data adapter is operated in a second control state in a portable part-mode.

* * * * *